(12) United States Patent
Majamaeki

(10) Patent No.: US 10,183,704 B2
(45) Date of Patent: Jan. 22, 2019

(54) VEHICLE BODY HAVING A SIDE SILL AND A BASE PLATE

(71) Applicant: Bayerische Motoren Werke Aktiengesellschaft, Munich (DE)

(72) Inventor: Jyrki Majamaeki, Dorfen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 55 days.

(21) Appl. No.: 15/245,345

(22) Filed: Aug. 24, 2016

(65) Prior Publication Data

US 2016/0362140 A1 Dec. 15, 2016

Related U.S. Application Data

(63) Continuation of application No. PCT/EP2015/053538, filed on Feb. 19, 2015.

(30) Foreign Application Priority Data

Feb. 25, 2014 (DE) .......... 10 2014 203 330

(51) Int. Cl.
| | |
|---|---|
| *B62D 25/20* | (2006.01) |
| *B62D 27/02* | (2006.01) |
| *B62D 29/04* | (2006.01) |
| *B62D 21/15* | (2006.01) |

(52) U.S. Cl.
CPC ......... *B62D 25/2036* (2013.01); *B62D 21/15* (2013.01); *B62D 27/023* (2013.01); *B62D 29/043* (2013.01)

(58) Field of Classification Search
CPC .......................... B62D 25/2036; B62D 29/043

USPC .............. 296/187.08, 193.07, 209
See application file for complete search history.

(56) References Cited

U.S. PATENT DOCUMENTS

| | | | |
|---|---|---|---|
| 2013/0113237 A1 | 5/2013 | Huhn | |
| 2013/0313862 A1* | 11/2013 | Yamaji | B62D 25/025 296/203.01 |
| 2015/0008703 A1* | 1/2015 | Furusaki | B62D 21/152 296/187.08 |
| 2015/0084376 A1* | 3/2015 | Shigihara | B62D 25/087 296/193.07 |
| 2015/0137558 A1* | 5/2015 | Ayuzawa | B62D 25/2036 296/193.07 |

(Continued)

FOREIGN PATENT DOCUMENTS

| | | |
|---|---|---|
| CN | 1495080 A | 5/2004 |
| CN | 101121423 A | 2/2008 |

(Continued)

OTHER PUBLICATIONS

English-language translation of Chinese Office Action issued in counterpart Chinese Application No. 201580009146.5 dated Jun. 2, 2017 (six (6) pages).

(Continued)

*Primary Examiner* — Jason S Morrow
(74) *Attorney, Agent, or Firm* — Crowell & Moring LLP

(57) ABSTRACT

A vehicle body has a side sill, which has an upper wall and a lower wall, and a floor plate. The side sill and the floor plate are connected to each other. The side sill has a hollow profile, and the floor plate is designed such as to overlap the upper wall and/or the lower wall of the side sill.

17 Claims, 3 Drawing Sheets

(56) References Cited

U.S. PATENT DOCUMENTS

| | | | | |
|---|---|---|---|---|
| 2015/0137561 A1* | 5/2015 | Kuepper | ............... | B62D 25/025 296/209 |
| 2015/0158532 A1* | 6/2015 | Ayuzawa | ........... | B62D 25/2009 296/193.07 |
| 2015/0258956 A1* | 9/2015 | Sassi | ................... | B60R 21/0136 701/45 |
| 2015/0352753 A1* | 12/2015 | Konrad | ................... | B29C 70/42 428/221 |
| 2016/0200014 A1* | 7/2016 | Patberg | .................. | B29C 70/46 264/442 |
| 2017/0267290 A1* | 9/2017 | Ayuzawa | ............. | B62D 21/157 |

FOREIGN PATENT DOCUMENTS

| | | |
|---|---|---|
| DE | 102 48 661 A1 | 5/2004 |
| DE | 10 2005 024 263 A1 | 12/2006 |
| DE | 10 2008 036 177 A1 | 2/2010 |
| DE | 10 2010 014 574 A1 | 10/2011 |
| DE | 10 2010 030 515 A1 | 12/2011 |
| DE | 10 2011 085 590 A1 | 5/2013 |
| JP | 5-96238 A | 4/1993 |
| WO | WO 2009/066043 A1 | 5/2009 |
| WO | WO 2013/190889 A1 | 12/2013 |

OTHER PUBLICATIONS

International Search Report (PCT/ISA/210) issued in PCT Application No. PCT/EP2015/053538 dated Apr. 22, 2015 with English-language translation (six (6) pages).

German-language Written Opinion (PCT/ISA/237) issued in PCT Application No. PCT/EP2015/053538 dated Apr. 22, 2015 (six (6) pages).

German Search Report issued in counterpart German Application No. 10 2014 203 330.6 dated Oct. 22, 2014 with partial English-language translation (twelve (12) pages).

\* cited by examiner

VEHICLE BODY HAVING A SIDE SILL AND A BASE PLATE

CROSS REFERENCE TO RELATED APPLICATIONS

This application is a continuation of PCT International Application No. PCT/EP2015/053538, filed Feb. 19, 2015, which claims priority under 35 U.S.C. § 119 from German Patent Application No. 10 2014 203 330.6, filed Feb. 25, 2014, the entire disclosures of which are herein expressly incorporated by reference.

BACKGROUND AND SUMMARY OF THE INVENTION

The present invention relates to a vehicle body for a passenger motor vehicle, having a side sill and a floor panel which are connected to each other.

DE 102010030515 A1 discloses, for example, a body of a passenger motor vehicle, which has two side sills between which a floor having hollow chambers extends, wherein the floor is fastened to inner side walls of the side sills via mounting brackets. The side sills are formed in the manner of a shell from a carbon fiber reinforced plastic, and the floor is formed from a light metal alloy. Furthermore, energy absorption elements are accommodated in the cavities of the side sills in order to be able to adequately absorb energy in the event of a collision from the side.

Furthermore, a conventional vehicle body which has a side sill consisting of an inner plate and an outer plate and also a reinforcing plate, which plates form a closed hollow profile, is shown in DE 102011085590 A1. The reinforcing plate forms an inner side wall of the side sill, wherein a floor plate is secured on the side wall of the reinforcing plate.

In general, known side sills serve to adequately protect a vehicle interior, in particular a passenger cell, in the event of a lateral collision and to dissipate collision energy. For this purpose, a side sill has to have sufficient strength and sufficient collision energy absorption capability.

It is the object of the present invention to provide a vehicle body with a side sill and a floor panel, wherein a strength and collision energy absorption capability of the vehicle body, in particular of the side sill, in relation to a side collision is sufficiently high with little weight.

This and other objects are achieved by a vehicle body comprising a side sill and a floor panel. According to the present invention, the vehicle body has a side sill which has an upper wall and a lower wall and which is designed in the manner of a hollow profile. Furthermore, the vehicle body according to the invention has a floor panel, wherein the side sill and the floor panel are connected to each other. According to the present invention, the floor panel is designed so as to overlap the upper wall and/or the lower wall of the side sill. In particular, the floor panel overlaps the upper wall and/or the lower wall in a transverse direction of the vehicle body and in a longitudinal direction of the vehicle body.

A vehicle body according to the present invention is preferably a motor vehicle body and, in particular, a passenger motor vehicle body, wherein the vehicle body preferably has a passenger cell which is formed between what is referred to as a front end and what is referred to as a rear end.

A side sill according to the present invention is a lower, outer lateral longitudinal member which extends in a region between a front wheel house and a rear wheel house—between the front end and the rear end.

Customarily, a vehicle body of this type has a left side sill and a right side sill between which a single floor panel or a plurality of floor panels extends or extend.

The side sill preferably has a closed hollow profile.

By use of the overlapping arrangement according to the invention of the side sill and the floor panel in the x direction (longitudinal direction of the body) and y direction (transverse direction of the body), i.e. overlapping an upper wall and a lower wall, the floor panel forms a reinforcement of the hollow profile of the side sill and therefore increases the strength and collision energy absorption capacity of the side sill. By way of the arrangement according to the invention of the floor panel, the side sill can be, for example, advantageously designed to be lighter. An additional reinforcing element of the side sill or an energy absorption element can be omitted or can be designed to be lighter than in the case in which the floor panel does not, as proposed according to the invention, overlap the side sill. The present invention therefore also makes it possible to reduce the number of parts. In the event of a lateral collision, the floor panel, by overlapping the side sill, already contributes to collision energy absorption at an early point in the collision, i.e. at an early point in a deformation of the side sill.

According to a preferred development of the vehicle body of the present invention, the floor panel extends substantially over an entire width of the side sill, i.e. a width of the side sill in the y direction. In other words, the floor panel is preferably designed so as to overlap the upper wall and/or the lower wall of the side sill preferably substantially over an entire width of the side sill.

By this means, during the lateral collision, a collision opponent not only strikes directly against the side sill, but also directly against the floor panel, which can therefore contribute directly to absorbing the collision energy by plastic deformation and/or small-scale brittle fracture.

The floor panel can preferably extend as far as an outer side wall of the side sill. The floor panel can advantageously be connected to the outer side wall.

The expression outer side wall of the side sill means the wall which is arranged facing an outer side of the vehicle body. By the floor panel extending as far as the outer side wall, an energy absorption capacity of the floor panel itself can be used advantageously even at the beginning of a deformation of the side sill, i.e. even during deformation of the outer side wall of the side sill.

By this means, a reinforcing and strength-increasing effect of the floor plate can be particularly readily realized.

According to a further preferred development, the floor panel is arranged lying against an outer side or an inner side of the upper wall or of the lower wall of the side sill and is connected to the corresponding wall, i.e. to the upper wall or to the lower wall.

The outer side of the upper wall is the side which faces an upper side of the vehicle body, while the inner side of the upper wall is the side which faces a lower side of the vehicle body and, in particular, faces an inner chamber of the hollow profile.

In the case of the vehicle body according to the present invention, the floor panel is preferably arranged between an upper wall and a lower wall of the side sill. The floor panel can additionally advantageously penetrate an inner side wall of the side sill. In other words, the inner side wall can be designed in two parts, with an upper inner side wall and a lower inner side wall, wherein the floor panel runs between the upper inner side wall and the lower inner side wall. The inner side wall is advantageously connected here to the floor panel. Furthermore, the floor panel can additionally penetrate an outer side wall of the side sill. In the same manner as the inner side wall, the outer side wall can be formed with an upper outer side wall and a lower outer side wall, wherein the floor panel runs between the upper inner side wall and the lower inner side wall. The inner side wall is advantageously connected here to the floor panel.

In the case in which the floor panel penetrates both the inner side wall and the outer side wall, the side sill can advantageously be formed from an upper half shell of the hollow profile and a lower half shell of the hollow profile, wherein the floor panel is arranged between the half shells.

In the case in which the floor panel penetrates the inner side wall of the side sill or additionally penetrates the outer side wall of the side sill, the floor panel can be arranged at a distance from the upper wall and from the lower wall.

By this means, the floor panel divides an interior space, i.e. a hollow chamber, of the side sill into an upper region and a lower region and, therefore, advantageously increases the strength and an energy absorption capacity of the side sill in combination with the floor panel.

In an alternative embodiment, the floor panel can also replace the upper wall or the lower wall of the side sill. In other words, in this case, the floor panel forms the upper wall or the lower wall of the side sill. The side sill is designed in this case as an open hollow profile, wherein the floor panel forms a closed hollow profile here together with the side sill.

The floor panel can be formed in multiple layers, in particular in the form of what is referred to as a sandwich construction, since a construction of this type has a higher energy absorption capacity.

According to a particularly preferred embodiment, the floor panel has an upper layer and a lower layer which are at a distance from each other.

By this means, in the event of a side collision, buckling of the floor panel is more difficult and therefore the strength and the energy absorption capacity of the floor panel are increased. In addition, reinforcement of the side sill is thereby improved.

In the case of the floor panel with the upper layer and the lower layer, a foam layer can preferably be formed as an intermediate layer between the upper layer and the lower layer. Any known foamed material can preferably be used in this case. A foam layer as the intermediate layer is light and stabilizes the upper layer and the lower layer with respect to each other, and therefore the above-described buckling of the floor panel is even better prevented.

An intermediate layer composed of a honeycomb material, i.e. a honeycomb layer, can be arranged as an alternative or in addition to the foam layer. The honeycomb material can be formed from plastic or else from a metallic material, such as a light metal. Analogously to the above-described foam layer, a honeycomb layer of this type has advantages in respect of making buckling of the floor panel more difficult and stabilizing the upper layer in relation to the lower layer.

In addition or as a further alternative, any other spacer element can also be arranged as an intermediate layer between the upper layer and the lower layer, wherein the spacer element ensures that the upper layer and the lower layer are at a distance from each other, and is sufficiently light. For example, a suitable spacer element is a profiled plate or a plurality of profiled plates. The spacer element can have a U profile or a V profile.

The floor panel can also be provided with additional reinforcing elements on one side of the floor panel or on both sides which are designed in such a manner that they form hollow profiles together with the floor panel.

This is likewise advantageous in respect of preventing buckling of the floor panel in the event of a side collision and therefore improves the energy absorption capacity of the vehicle body as a whole during the side collision.

According to an advantageous development of the present invention, the side sill can be formed from a fiber composite. Any fiber composite which is used in vehicle manufacturing and/or body manufacturing is suitable as the fiber composite. A carbon fiber composite is particularly preferred because of its high strength.

The fiber composite can be formed in particular with endless fibers which further increase the strength of the side sill.

According to a further preferred embodiment, the floor panel is formed at least in regions from a fiber composite. Also in this case, any fiber composite which is advantageous for use in vehicle bodies is conceivable, wherein a carbon fiber composite is particularly preferred. The floor panel can be completely composed of fiber composite. However, the floor panel can also be composed in multi-layered form from different materials in a mixed construction. For example, in the case in which the floor panel has an upper layer and a lower layer, one of the two layers can be formed from fiber composite. Both layers can also be formed from fiber composite. A layer arranged in-between, i.e. an intermediate layer, can also be formed from a different material, such as, for example, in the case of the above-described foam layer or honeycomb layer or spacer layer.

Endless fibers are particularly preferably used as fibers in the fiber composite.

Endless fibers are particularly advantageous in comparison to short fibers or long fibers in respect of the strength of the floor panel. In particular, it is particularly simple in the case of endless fibers to arrange them in a specific manner in one or more defined directions, and therefore stressing due to a side collision can be particularly easily countered.

Other objects, advantages and novel features of the present invention will become apparent from the following detailed description of one or more preferred embodiments when considered in conjunction with the accompanying drawings.

DETAILED DESCRIPTION OF THE DRAWINGS

Exemplary embodiments of the present invention are explained below with reference to FIGS. 1 to 6.

Figure 1:
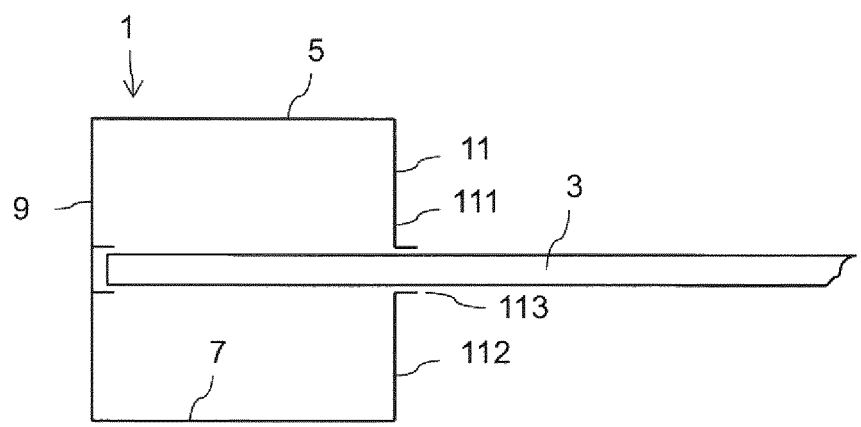
FIG. 1 is a schematic sectional view through a side sill and a floor panel according to a first exemplary embodiment of the present invention.

FIG. 1 shows a first exemplary embodiment of the present invention. According to the first exemplary embodiment of the present invention, a vehicle body has a side sill 1 and a floor panel 3. The side sill 1 is a side sill of a passenger motor vehicle, wherein the side sill 1 is a lower, outer, lateral longitudinal member which is arranged between a front wheel house and a rear wheel house and is a constituent part of a passenger cell. The floor panel 3 forms a floor of the passenger cell. Only a left side sill 1 is shown in FIG. 1. The vehicle body according to the first exemplary embodiment also has a right side sill, wherein the floor panel 3 preferably extends from the left side sill 1 to the right side sill. However, the vehicle body can also have a "central tunnel", wherein a left floor panel extends from the left side sill as far as the central tunnel, and a right floor panel extends from the right side sill as far as the central tunnel. A single floor panel 3 can be arranged in the longitudinal direction of the vehicle body, but a plurality of floor panels can also be arranged one behind another. The floor panel 3 can be approximately the same length in the longitudinal direction as the side sill 1.

The side sill 1 is formed from a carbon fiber reinforced plastic, i.e. a carbon fiber composite, and forms a closed hollow profile which has an upper wall 5, a lower wall 7, an outer side wall 9 and an inner side wall 11. The floor panel 3 is arranged so as to overlap the side sill 1 in the x direction and in the y direction of the motor vehicle body—i.e. in the longitudinal direction of the vehicle and in the transverse direction of the vehicle—and in particular overlaps the upper wall 5 and the lower wall 7 of the side sill 1. The floor panel 3 overlaps substantially an entire width of the side sill 1 here.

The floor panel 3 is arranged between the upper wall 5 and the lower wall 7 and penetrates the inner side wall 11 through a slot-shaped opening 113 in the inner side wall 11. The opening 113 divides the inner side wall 11 into an upper inner side wall 111 and a lower inner side wall 112. The floor panel 3 is connected to the upper inner side wall 111 and the lower inner side wall 112. Furthermore, the floor panel 3 extends as far as the outer side wall 9 and is connected to the outer side wall 9.

The floor panel 3 is secured to the side sill 1 in an integrally bonded, frictional and/or force-fitting manner.

The floor panel 3 is in multi-layered form in the manner of a sandwich construction, wherein the floor panel 3 has an upper layer and a lower layer. One or more further intermediate layers can be arranged between the upper layer and the lower layer, wherein, for example, a foam core or a honeycomb core can be arranged between the lower and upper layer. Furthermore, as an alternative or in addition, a profiled layer can be arranged between the upper layer and the lower layer, said profiled layer spacing the upper layer and the lower layer from each other and forming cavities between the upper layer and the lower layer. The upper layer and the lower layer are composed of a carbon fiber reinforced plastic, wherein in particular directed endless fibers are used. Other fiber composites and also metallic materials are also possible for forming the floor panel 3.

In the event of a side collision, for example with a pole-shaped obstacle, the described arrangement of the floor panel 3 reinforces the side sill 1 and permits additional energy absorption potential during the deformation of the side sill 1. Furthermore, by way of the overlapping arrangement of the floor panel 3 with the side sill 1, the collision obstacle strikes directly, or after a very short deformation path of the side sill 1, against the floor panel 3 which can contribute directly to the absorption of collision energy. By way of the multi-layered design of the floor panel 3, the floor panel 3 can absorb higher loads in the y direction without the floor panel buckling, and therefore an energy absorption potential remains at a high level during deformation or small-scale brittle fracture of the floor panel 3.

Overall, the side sill 1 can thereby be designed to be lighter and less strong, and/or the floor panel 3 can replace additional energy absorption elements within the side sill 1.

Further exemplary embodiments of the present invention are described below with reference to FIGS. 2 to 7, wherein identical or similar features are denoted by the same reference signs and essentially only differences over the first exemplary embodiment are described, and a description of the similarities or coincidences with the first exemplary embodiment are essentially omitted.

Figure 2:
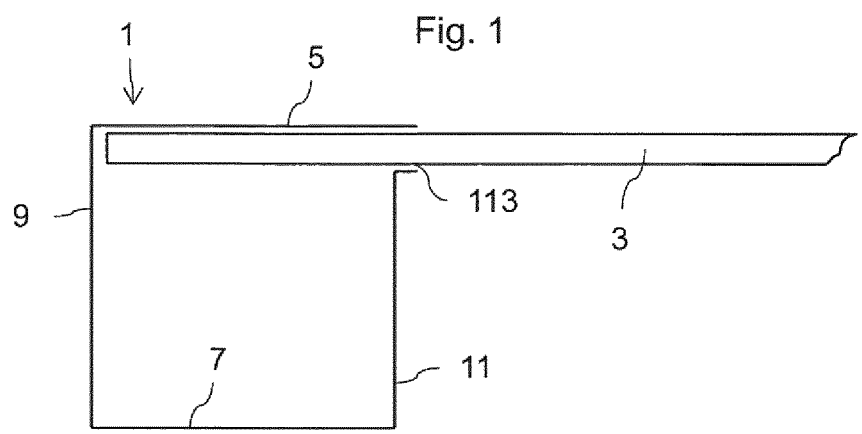
FIG. 2 is a schematic sectional view through a side sill and a floor panel according to a second exemplary embodiment of the present invention.

FIG. 2 shows a second exemplary embodiment, wherein a side sill 1 and a floor panel 3 are arranged so as to overlap each other. In particular, the floor panel 3 is arranged opposite or adjacent to an inner side of an upper wall 5 of the side sill 1. The floor panel 3 penetrates an inner side wall 11 or the inner side wall 11 ends at the floor panel 3. A slot 113 through which the floor panel 3 runs is formed between the inner side wall 11 and the upper wall 5. The floor panel 3 is preferably connected to the upper wall 5 in an integrally bonding, frictional and/or form-fitting manner, for example by adhesive bonding. Furthermore, the floor panel 3 is connected to the inner side wall 11.

As in the first exemplary embodiment, the floor panel 3 can be a multi-layered form, as described with respect to the first exemplary embodiment.

Figure 3:
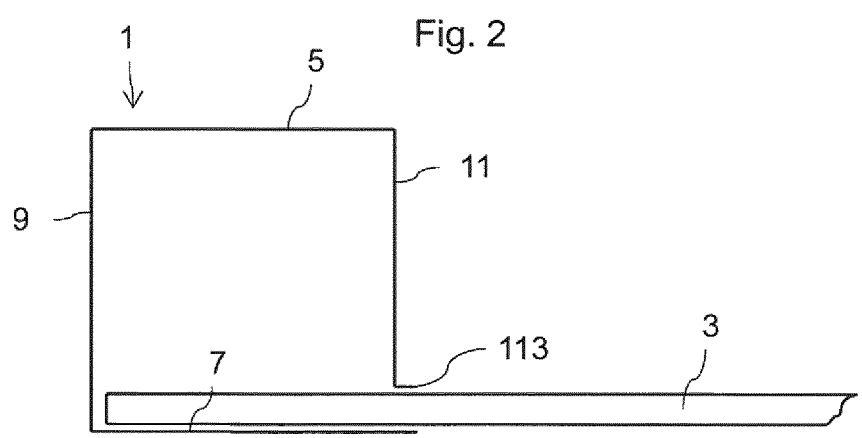
FIG. 3 is a schematic sectional view through a side sill and a floor panel according to a third exemplary embodiment of the present invention.

FIG. 3 illustrates a third exemplary embodiment of the present invention, wherein the third exemplary embodiment substantially corresponds to the second exemplary embodiment except that a floor panel 3 is arranged adjacent to a lower wall 7 of a side sill 1 and is connected thereto, and the floor panel 3 penetrates a slot 113 between an inner side wall 11 and the lower wall 7.

Figure 4:
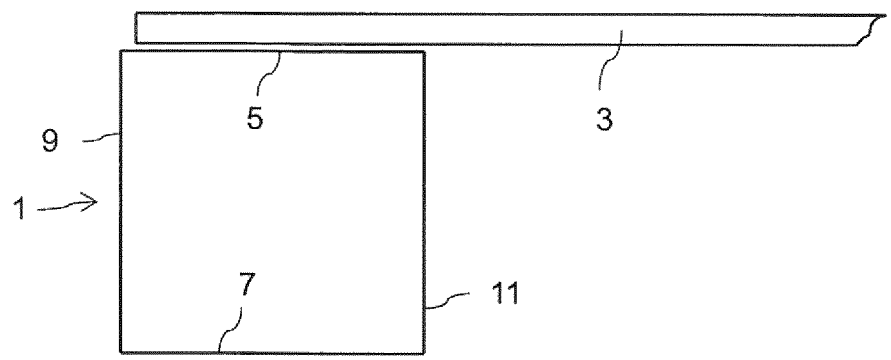
FIG. 4 is a schematic sectional view through a side sill and a floor panel according to a fourth exemplary embodiment of the present invention.

FIG. 4 shows a fourth exemplary embodiment of the present invention, wherein the fourth exemplary embodiment differs from the preceding exemplary embodiments in that a floor panel 3 is formed adjacent to an outer side of an upper wall 5 of a side sill 1 and is connected to the upper wall 5. The floor panel 3 overlaps substantially an entire width of the side sill 1 here.

As an alternative to the fourth exemplary embodiment, in a modification of the fourth exemplary embodiment, the floor panel 3 can also be arranged adjacent to an outer wall of the lower wall 7 and can be connected to the lower wall 7.

Figure 5:
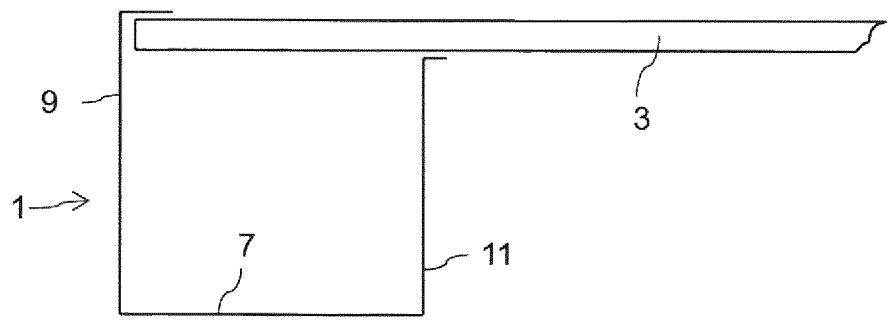
FIG. 5 is a schematic sectional view through a side sill and a floor panel according to a fifth exemplary embodiment of the present invention.
Figure 6:
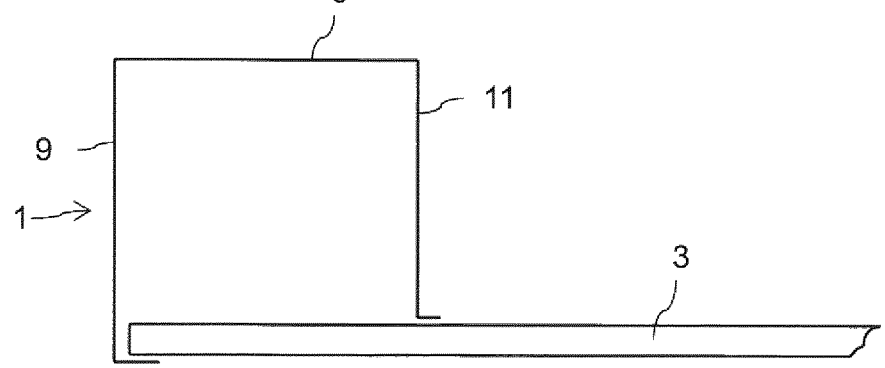
FIG. 6 is a schematic sectional view through a side sill and a floor panel according to a sixth exemplary embodiment of the present invention.

According to a fifth and sixth exemplary embodiment shown in FIGS. 5 and 6, a floor panel 3 replaces an upper wall and a lower wall of a side sill 1, respectively, and forms a closed hollow profile together with the side sill 1.

Figure 7:
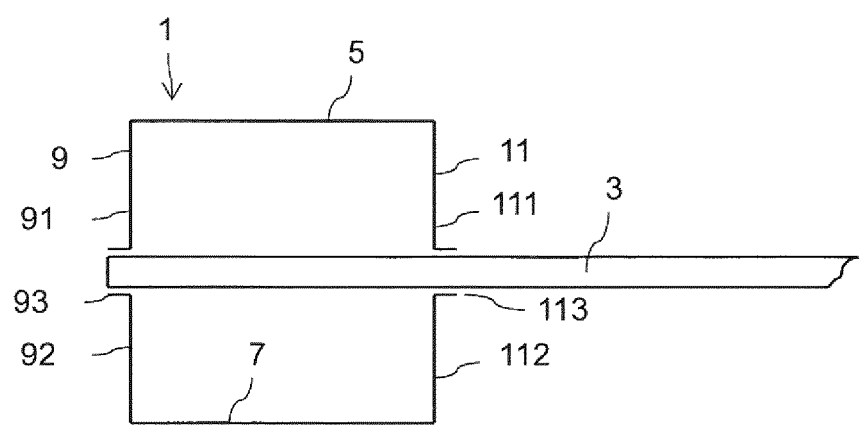
FIG. 7 is a schematic sectional view through a side sill and a floor panel according to a seventh exemplary embodiment of the present invention.

FIG. 7 shows a seventh exemplary embodiment of the present invention, wherein, in accordance with the first exemplary embodiment, a floor panel 3 penetrates an inner side wall 11 of a side sill. The floor panel 3 is arranged between an upper wall 5 and a lower wall 7 of the side sill 1. In contrast to the first exemplary embodiment, the floor panel 3 additionally penetrates an outer side wall 9 through a slot-shaped opening 93 in the outer side wall 9. The opening 93 divides the outer side wall 9 into an upper outer side wall 91 and a lower outer side wall 92. The floor panel 3 is connected to the upper outer side wall 91 and the lower outer side wall 91. The side sill 1 can consist here in particular of two half shells, an upper half shell with the upper wall 5, the upper outer side wall 91 and the upper inner side wall 11, and a lower half shell with the lower wall 7, the lower outer side wall 93 and the lower inner side wall 112. The floor panel 3 is arranged and secured between the lower half shell and the upper half shell of the side sill.

In the second to seventh exemplary embodiment, the materials used for the side sill and the floor panel and also a multi-layered construction of the floor panel can be designed in the manner as described with respect to the first exemplary embodiment. A function and effect of the vehicle body with the side sill and the floor panel according to the first to sixth exemplary embodiment basically corresponds to the function and effect described with regard to the first exemplary embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body, comprising:
    a side sill which has an upper wall and a lower wall; and
    a separate floor panel, wherein
    the side sill and the floor panel are connected to each other,
    the side sill has a hollow profile, and
    the floor panel is configured so as to overlap one or both of the upper wall and the lower wall of the side sill substantially over an entire width of the side sill.

2. The vehicle body as claimed in claim 1, wherein the floor panel lies against an outer side or an inner side of the upper wall or of the lower wall of the side sill and is connected to the corresponding wall.

3. A vehicle body, comprising:
    a side sill which has an upper wall and a lower wall; and
    a floor panel, wherein
    the side sill and the floor panel are connected to each other,
    the side sill has a hollow profile,
    the floor panel is configured so as to overlap one or both of the upper wall and the lower wall of the side sill,
    the floor panel is arranged between the upper wall and the lower wall of the side sill, and
    the floor panel penetrates an inner side wall of the side sill and the floor panel additionally penetrates an outer side wall of the side sill.

4. The vehicle body as claimed in claim 3, wherein the floor panel is arranged at a distance from the upper wall and from the lower wall.

5. The vehicle body as claimed in claim 1, wherein the floor panel forms the upper wall or the lower wall of the side sill.

6. The vehicle body as claimed in claim 1, wherein the floor panel has an upper layer and a lower layer which are at a distance from each other.

7. The vehicle body as claimed in claim 6, wherein at least one foam layer, at least one honeycomb layer and/or at least one spacer element, is arranged between the upper layer and the lower layer.

8. The vehicle body as claim in claim 7, wherein the at least one spacer element is at least one profiled plate.

9. The vehicle body as claimed in claim 1, wherein a reinforcing element which, together with the floor panel, forms a hollow profile is attached at least on one side of the floor panel.

10. The vehicle body as claimed in claim 1, wherein the side sill is formed from a fiber composite.

11. The vehicle body as claimed in claim 10, wherein the fiber composite is formed with endless fibers.

12. The vehicle body as claimed in claim 10, wherein the fiber composite is a carbon fiber composite formed with endless fibers.

13. The vehicle body as claimed in claim 1, wherein the floor panel is formed at least in regions from a fiber composite.

14. The vehicle body as claimed in claim 13, wherein the fiber composite is formed with endless fibers.

15. The vehicle body as claimed in claim 13, wherein the floor panel is formed at least in regions from a carbon fiber composite with endless fibers.

16. The vehicle body according to claim 1, wherein the vehicle body is a motor vehicle body.

17. A vehicle body, comprising:
    a side sill which has an upper wall and a lower wall; and
    a separate floor panel, wherein
    the side sill and the floor panel are connected to each other,
    the side sill has a hollow profile,
    the floor panel is configured so as to overlap one or both of the upper wall and the lower wall of the side sill, and
    the floor panel penetrates into an interior of the hollow profile of the side sill.

* * * * *